United States Patent [19]
Lin

[11] Patent Number: 5,906,439
[45] Date of Patent: May 25, 1999

[54] MECHANISM FOR MAINTAINING LINEAR MOTION OF MECHANICAL ARM

[76] Inventor: Jui-Kun Lin, No. 407, Kuang Ming Rd., Wu Zun Hsian, Taichung Hsien, Taiwan

[21] Appl. No.: 08/980,292

[22] Filed: Nov. 28, 1997

[51] Int. Cl.[6] .................................................... F16C 29/04
[52] U.S. Cl. ............................................. 384/53; 384/58
[58] Field of Search .................................. 384/53, 58, 59, 384/55, 52

[56] References Cited

U.S. PATENT DOCUMENTS 4,874,194 10/1989 Borcea et al. ............................. 384/29
5,273,367 12/1993 Tanaka ..................................... 384/54

*Primary Examiner*—Lenard A. Footland
*Attorney, Agent, or Firm*—Browdy and Neimark

[57] ABSTRACT

A mechanism is composed of a seat, an air or oil cylinder, a connection seat, and a guide rod for maintaining the linear motion of a mechanical arm which is fastened with the connection seat. The guide rod is provided with a slot extending along the direction of the longitudinal axis of the guide rod. Two opposite walls of the slot of the guide rod are provided respectively with a rail enabling the guide rod to move linearly in conjunction with a plurality of rollers engageable with the rails. The axial positions of the rollers can be adjusted to correct the deviated motion of the guide rod.

10 Claims, 5 Drawing Sheets

5,906,439

MECHANISM FOR MAINTAINING LINEAR MOTION OF MECHANICAL ARM

FIELD OF THE INVENTION

The present invention relates generally to a mechanical arm, and more particularly to a mechanism for maintaining the linear motion of the mechanical arm.

BACKGROUND OF THE INVENTION

As illustrated in FIG. 1, a mechanical arm of the prior art has a seat 11, which is mounted on a robot stand and is provided with an air or oil pressure cylinder 16. The free end of a piston rod 17 of the cylinder 16 is provided with a connection seat 14 on which a working hand 15 is mounted. The seat 11 is further provided therein with a sleeve 12 through which a guide rod 13 is pivotally put through in such a manner that the guide rod 13 is fastened at one end thereof with the connection seat 14. The connection seat 14 is thus prevented from turning aside and is capable of being push or pulled by the piston rod 13 to move linearly so as to enable the working hand 15 to be positioned for working on the workpiece. The seat 11 is further provided respectively on both sides thereof with a buffering device 18 for absorbing the impact force exerting on a position restricting block 19 located on the connection seat 14 and the guide rod 13.

Such a prior art mechanical arm as described above is defective in design in that the driving efficiency of the cylinder 16 is undermined by a relatively large area of mechanical friction between the guide rod 13 and the sleeve 12, and that the guide rod 13 or the sleeve 12 is vulnerable to deflection capable of hampering the overall performance of the mechanical arm, and further that the guide rod 13 and the sleeve 12 must be made with precision to enable the mechanical arm to perform as expected.

SUMMARY OF THE INVENTION

It is therefore the primary objective of the present invention to provide a mechanism capable of maintaining the linear motion of a mechanical arm such that the efficiency of the mechanical arm is enhanced, and that the mechanical wear of the mechanical arm is mitigated to prolong the service life span of the mechanical arm.

It is another objective of the present invention to provide a mechanism capable of maintaining the linear motion of a mechanical arm at a relatively low cost.

In keeping with the principle of the present invention, the foregoing objectives of the present invention are attained by a mechanism consisting of a seat, a cylinder, a connection seat, and a guide rod. The guide rod is provided with a slot extending along the direction of the longitudinal axis of the guide rod. Two opposite walls of the slot are provided respectively with a rail enabling the guide rod to slide in conjunction with a plurality of rollers.

The foregoing objectives, features and functions of the present invention will be more readily understood upon a thoughtful deliberation of the following detailed description of the present invention with reference to the accompanying drawings.

DETAILED DESCRIPTION OF THE INVENTION

Figure 1:
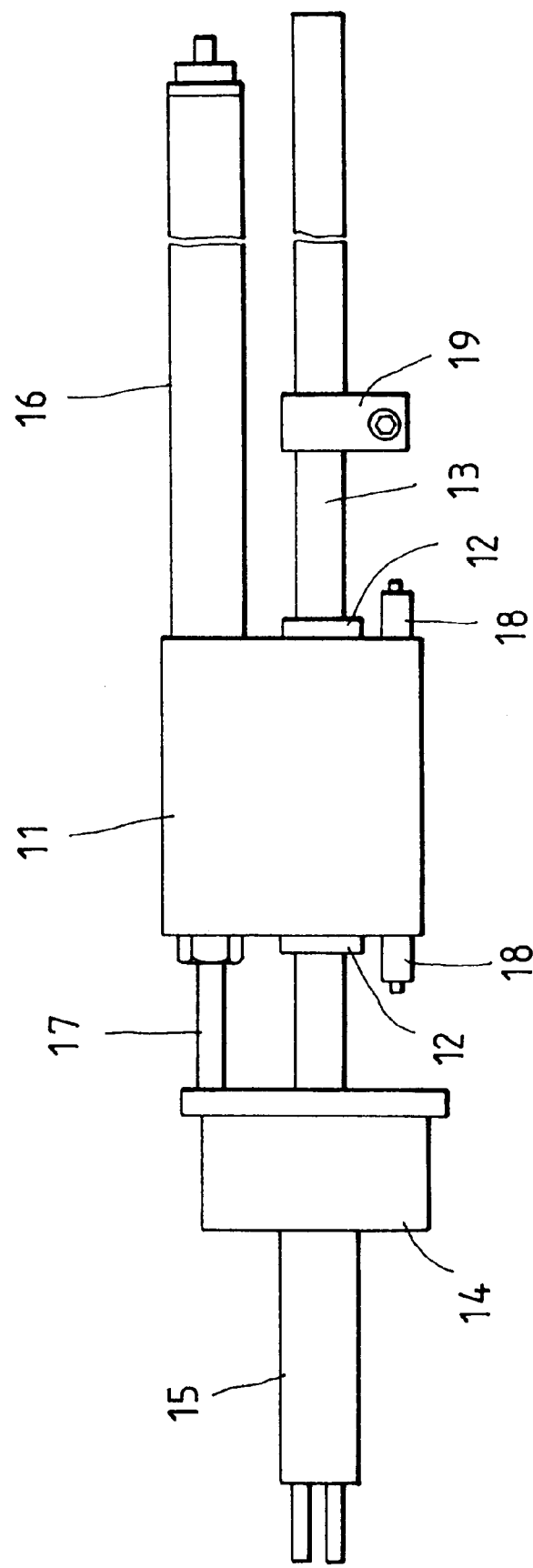
FIG. 1 shows a schematic view of a mechanical arm of the prior art.
Figure 2:
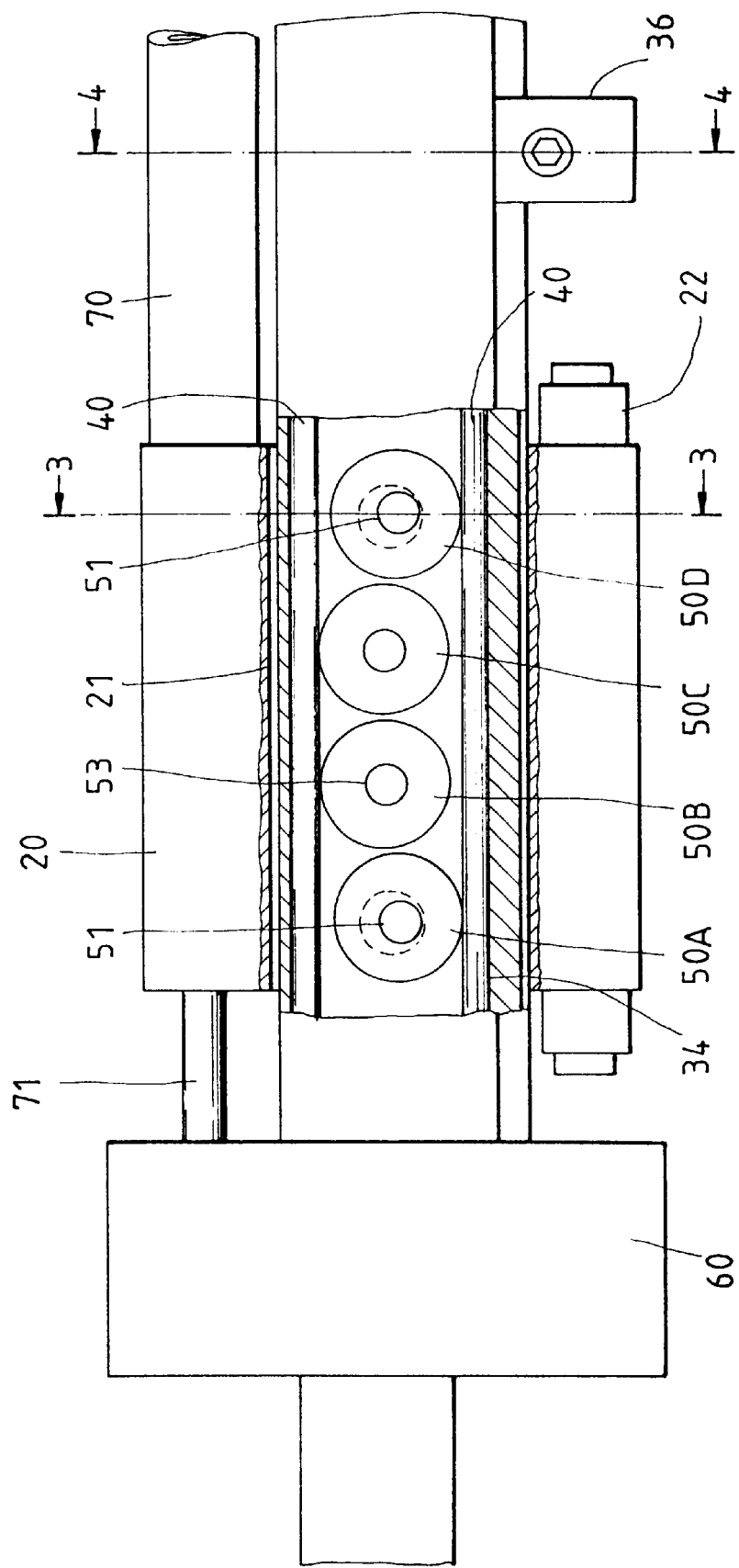
FIG. 2 shows a schematic view of a first preferred embodiment of the present invention.
Figure 3:
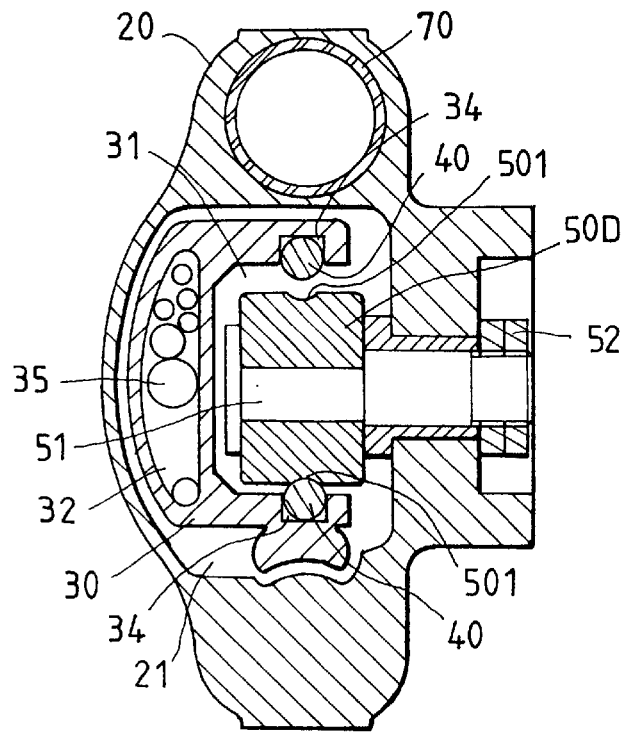
FIG. 3 shows a sectional view of a portion taken along the direction indicated by a line 3—3 as shown in FIG. 2.
Figure 4:
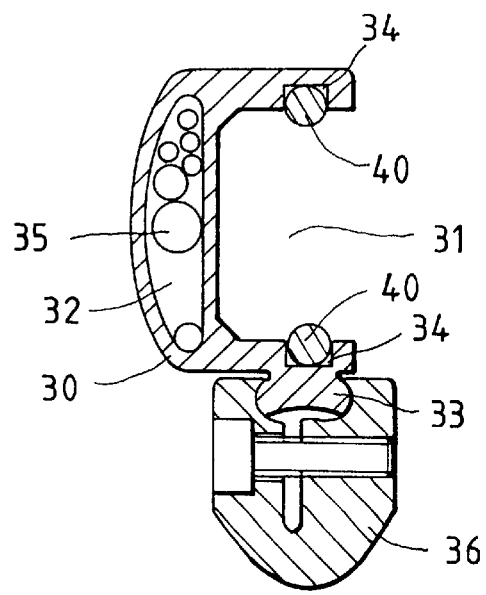
FIG. 4 shows a sectional view of a portion taken along the direction indicated by a line 4—4 as shown in FIG. 2.

As shown in FIGS. 2–4, a mechanism of the first preferred embodiment of the present invention is composed of the component parts which are described hereinafter.

A seat 20 is fastened movably with a robot stand such that the seat 20 can be driven to move in all directions and to rotate without displacing. The seat 20 is provided at the center thereof with a through hole 21.

An air or oil cylinder 70 is fastened with the seat 20 such that the cylinder 70 is parallel to the through hole 21.

A connection seat 60 is fastened with the free end of a piston rod 71 of the cylinder 70 for fastening a working hand.

A guide rod 30 is put through the through hole 21 without making a physical contact with the seat 20. The guide rod 30 has a U-shaped cross section and a slot 31 extending along the direction of the longitudinal axis of the guide rod 30. The slot 31 has an opening which faces the inner side of the seat 20. The slot 31 is provided respectively in two opposite walls thereof with a locating groove 34. These two locating grooves 34 are parallel to each other. The body wall of the guide rod 30 is provided with a wire cell 32 extending along the direction of the longitudinal axis of the guide rod 30 for locating a control wire 35 of a mechanical arm. The guide rod 30 is further provided with a rib 33 extending along the direction of the longitudinal axis of the guide rod 30 for locating a position restricting block 36, as illustrated in FIG. 4. The position restricting block 36 can be adjusted in location along the longitudinal axis of the rib 33 to make contact with a buffer device 22.

Two rails 40 are securely located in the two locating grooves 34 of the slot 31 of the guide rod 30.

Four rollers 50A, 50B, 50C and 50D are fastened pivotally in the through hole 21 of the seat 20 such that they are received in the slot 31 of the guide rod 30. Each of the rollers is provided in the circumferential surface thereof with an arcuate slot 501. The arcuate slots 501 of the rollers 50A and 50D are engaged with one rail 40, whereas the arcuate slots 501 of the rollers 50B and 50C are engaged with another rail 40.

The guide rod 30 is capable of sliding in the direction of the longitudinal axis of the guide rod 30 by means of the rails and the rollers, so as to enable the connection seat 60 to move linearly. In view of a relatively small area of mechanical friction between the rollers and the rails, the linear motion of the guide rod 30 is brought about smoothly and efficiently.

As shown in FIG. 3, the rollers 50A and 50D are contiguous to the ends of the through hole 21 of the seat 20 and are engaged pivotally with an eccentric shaft 51 which is in turn fastened pivotally with the seat 20 such that one end of the eccentric shaft 51 is jutted out of the seat 20 and is engaged with a nut 52. As a result, the operator can adjust the axial positions of the rollers 50A and 50D by turning the eccentric shaft 51. The eccentric shaft 51 can be locked by tightening the nut 52. In the meantime, the rollers 50B and 50C are engaged pivotally with a rotary shaft 53 which is in turn fastened with the inner side of the seat 20. The axial positions of the rollers 50B and 50C can not be adjusted.

After a prolonged service, the linear motion of the guide rod 30 may deviate from the normal course because of the wear of the rollers 50 and the rails 40. By adjusting the axial positions of the rollers 50A and 50D, the rollers 50B and 50C, as well as the rollers 50A and 50D, are securely engaged with the two rails 40 once again. As a result, the linear motion of the guide rod 30 is resumed with ease ad precision.

Figure 5:
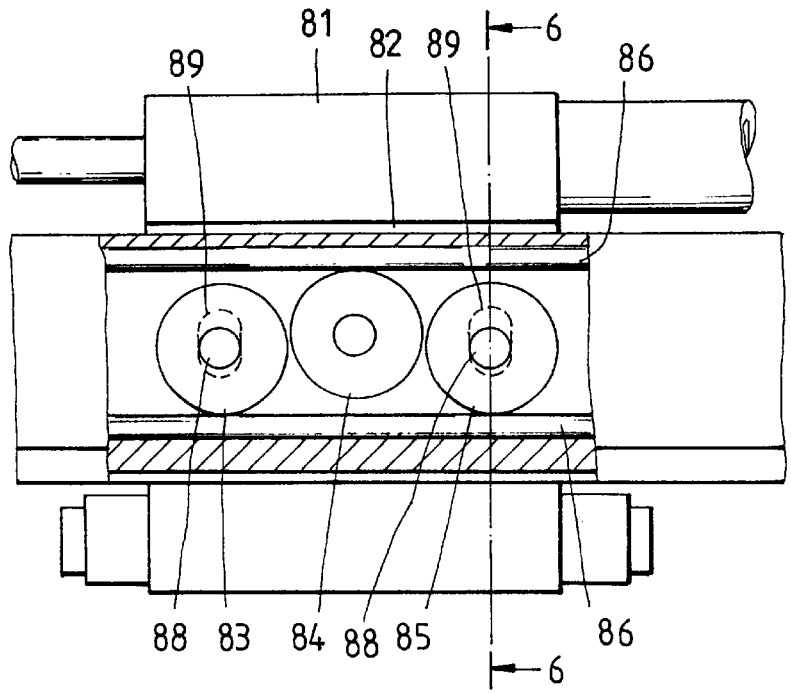
FIG. 5 shows a schematic view of a second preferred embodiment of the present invention.
Figure 6:
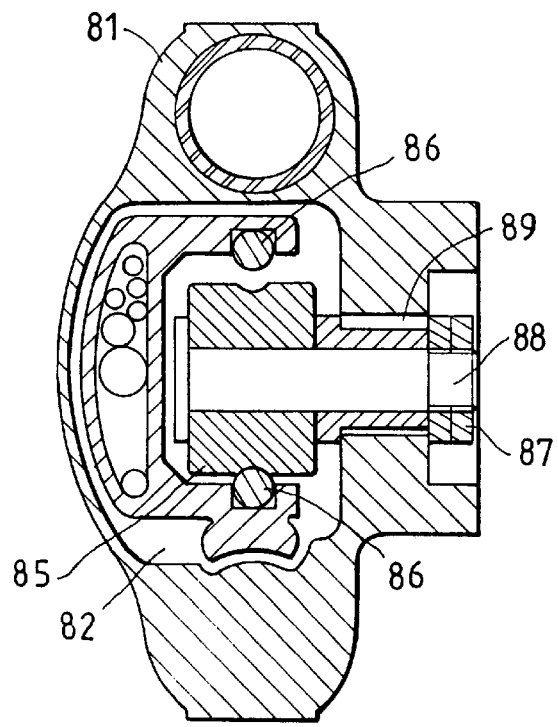
FIG. 6 shows a sectional view of a portion taken along the direction indicated by a line 5—5 as shown in FIG. 5.

As shown in FIGS. 5 and 6, the second preferred embodiment of the present invention is basically similar to the first preferred embodiment described above, with the difference being that the former comprises a seat 81 which is provided with three rollers 83, 84 and 85 fastened pivotally therewith. The rollers 83 and 85 are engaged with one rail 86 and are fastened pivotally with the seat 81 such that the axial positions of the rollers 83 and 85 can be adjusted. In the meantime, the roller 84 is engaged with another rail 86. The rollers 83 and 85 are engaged pivotally with a rotary shaft 88 which is movably located in a slot 89 of the seat 81 such that one end of the rotary shaft 88 is jutted out of the seat 81 and is engaged with a nut 87. By tightening the nut 87, the rotary shaft 88 can be locked.

Figure 7:
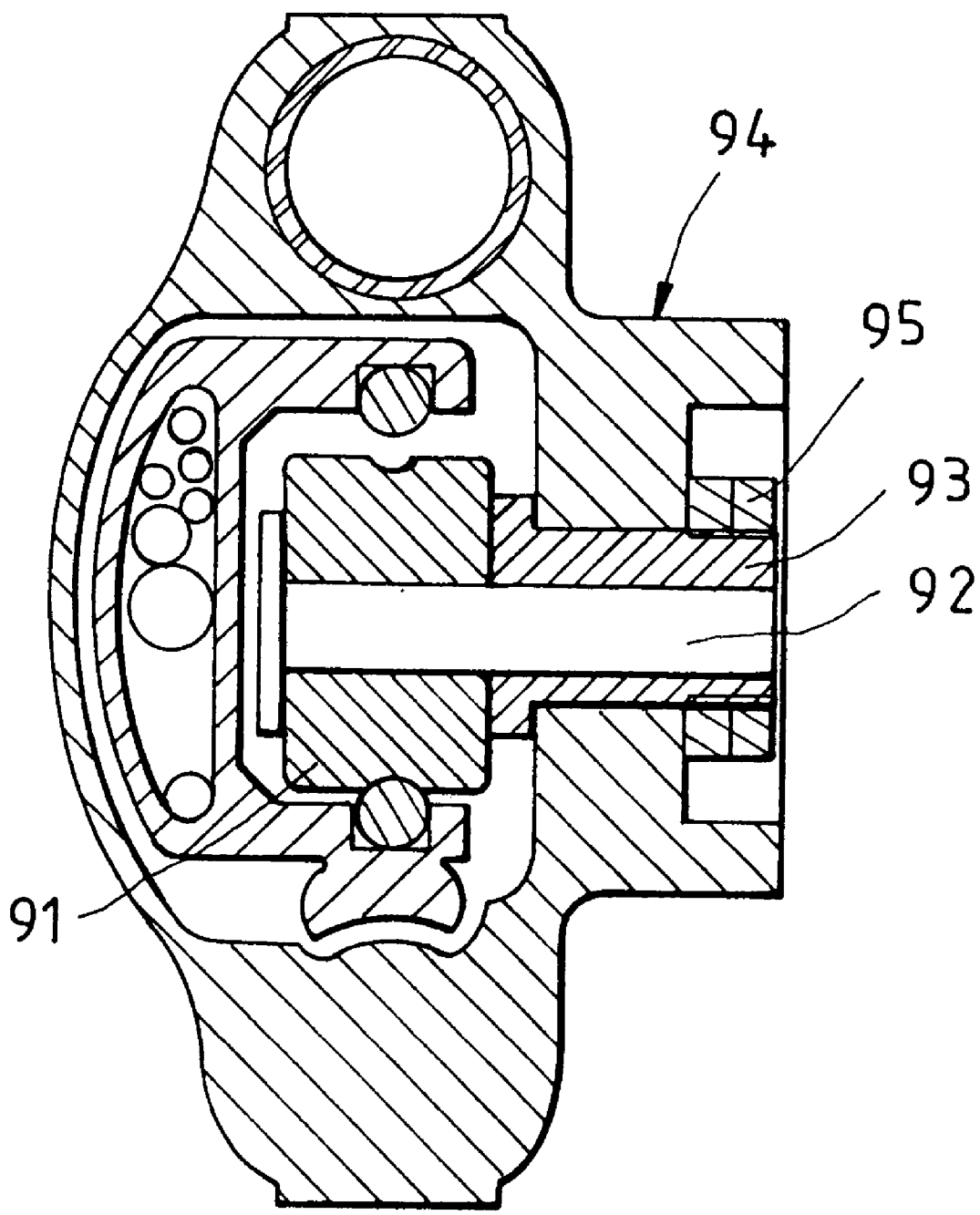
FIG. 7 shows a schematic view of third preferred embodiment of the present invention.

As shown in FIG. 7, the third preferred embodiment of the present invention comprises a roller 91 which is pivotally engaged with a rotary shaft 92 which is in turn engaged eccentrically with a sleeve 93. The axial position of the roller 91 can be adjusted. The sleeve 93 is fastened pivotally with the inner side of the seat 94 such that one end of the sleeve 93 is jutted out of the seat 94 and is engaged with a nut 95. The axial position of the roller 91 is adjusted by turning the sleeve 93. The sleeve 93 can be locked by tightening the nut 95.

What is claimed is:

1. A mechanism for maintaining the linear motion of a mechanical arm, said mechanism comprising:

a seat fastened movably with a robot stand;

an air or oil cylinder fastened with said seat;

a connection seat fastened with a free end of a piston rod of said cylinder for mounting a working hand; and a guide rod fastened pivotally with said seat such that said guide rod is parallel to said piston rod, and that said guide rod is fastened at one end thereof with said connection seat;

wherein said seat is provided with a through hole;

wherein said guide rod is located in said through hole such that said guide rod does not make a contact with said seat, said guide rod having a U-shaped cross section and a slot extending along the direction of a longitudinal axis of said guide rod, said slot having two opposite walls each provided with a rail;

wherein said seat is further provided with at least three rollers fastened pivotally therewith such that said rollers are located in said slot of said guide rod, and that two of said three rollers are engaged with one of the two rails of said slot of said guide rod, and further that the remainder of said three rollers is engaged with another one of the two rails.

2. The mechanism as defined in claim 1, wherein at least two of said three rollers have an adjustable axis.

3. The mechanism as defined in claim 2, wherein said two rollers are contiguous to two open ends of said through hole of said seat and are engaged with said one of the two rails.

4. The mechanism as defined in claim 2, wherein said two rollers are engaged pivotally with an eccentric shaft which is in turn fastened pivotally with said seat in such a manner that one end of said eccentric shaft is jutted out of said seat and is engaged with a nut capable of locking said eccentric shaft.

5. The mechanism as defined in claim 2, wherein said two rollers are pivotally engaged with a rotary shaft located in a slot of said seat in such a manner that one end of said rotary shaft is jutted out of said seat and is engaged with a nut capable of locking said rotary shaft.

6. The mechanism as defined in claim 2, wherein said two rollers are pivotally engaged with a rotary shaft which is in turn engaged eccentrically with a sleeve, said sleeve being pivotally fastened with said seat such that one end of said sleeve is jutted out of said seat and is engaged with a nut capable of locking said sleeve.

7. The mechanism as defined in claim 1, wherein said two opposite walls of said slot of said guide rod are provided respectively with a locating groove for locating one of said two rails.

8. The mechanism as defined in claim 1, wherein each of said rollers is provided in a circumferential surface thereof with an arcuate slot engageable with said rails.

9. The mechanism as defined in claim 1, wherein said guide rod is further provided with a rib extending along the direction of a longitudinal axis of said guide rod, and a position restricting block movably engaged with said rib.

10. The mechanism as defined in claim 1, wherein said guide rod is provided with a cell extending along the direction of a longitudinal axis of said guide rod for locating a control wire of a mechanical arm.

* * * * *